United States Patent [19]

Carlson

[11] 4,309,862
[45] Jan. 12, 1982

[54] LAWN MOWER AND CONTROLS THEREFOR

[75] Inventor: John A. Carlson, Conroe, Tex.
[73] Assignee: Capro, Inc., Conroe, Tex.
[21] Appl. No.: 157,374
[22] Filed: Jun. 9, 1980
[51] Int. Cl.³ .............................................. A01D 75/28
[52] U.S. Cl. .................................. 56/10.5; 192/.094; 192/.082; 56/11.3
[58] Field of Search ............................. 56/10.5, 11.3; 192/.094, .082

[56] References Cited

U.S. PATENT DOCUMENTS

| | | | |
|---|---|---|---|
| 4,044,533 | 8/1977 | Wick | 56/10.5 |
| 4,158,944 | 6/1979 | Rabinow | 56/11.3 |
| 4,209,964 | 7/1980 | Fuelling et al. | 56/11.2 |
| 4,221,108 | 9/1980 | Owens | 56/10.5 |

*Primary Examiner*—Robert A. Hafer
*Attorney, Agent, or Firm*—Vinson & Elkins

[57] ABSTRACT

A lawn mower having a housing mounted on wheels, an engine, a centrifugal clutch connected to the engine drive shaft, a cutting blade connected to the clutch, a brake connected to stop the cutting blade's rotation, a brake actuating arm connected to the brake, a spring biasing the brake arm to the set or braking position, a U-shaped handle connected to the housing and extending upward and rearward with a cross portion at its outer end, a throttle actuating arm on the engine, a control plate secured to the side of the handle, a spring biasing the throttle actuating arm toward idle and shut-off position, a throttle control line connected to a throttle actuating arm extending through a sheath to a throttle control lever on the control plate, a brake control line connected to the brake actuating arm, extending through a sheath and connecting to a brake control lever, the brake control lever and the throttle control levers being interconnected so that the brake control lever retains the throttle control lever in running position while the brake control lever is held in operating position but the throttle control lever is released to idle position when the brake control lever is released.

10 Claims, 7 Drawing Figures

LAWN MOWER AND CONTROLS THEREFOR

BACKGROUND

Power lawn mowers using gasoline engines, even those having some clutch connection between the drive shaft and the cutting blade, are dangerous because the blade continues to rotate at high speed when the operator lets go of the handle. Some mowers have a clutch plate engaging the blade to allow it to stop rotating if it hits a solid object. This does not protect against hands and feet being severely cut by the blade. Also, with some of these clutches there is no provision to cause the engine to slow when the blade stops turning.

SUMMARY

The present invention relates to an improved power lawn mower and an improved combined brake and throttle control in which the brake control lever interengages with the throttle control lever to stop the blade and idle the engine whenever the operator releases the brake control. The improved mower has a dual lever throttle control, one lever which is connected to the throttle control line and the other of which is releasably secured to the first lever and which engages a detent on the brake control lever to hold the throttle power setting as long as the brake control lever is held in operating position.

An object of the present invention is to provide an improved power lawn mower which is safer to use.

Another object is to provide an improved power lawn mower having controls so that the engine idles and the blade does not rotate whenever the operator releases his hold on the handle.

A further object is to provide an improved power lawn mower controls which upon the application of the brake to stop the rotation of the cutting blade reduces the engine speed to idle.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
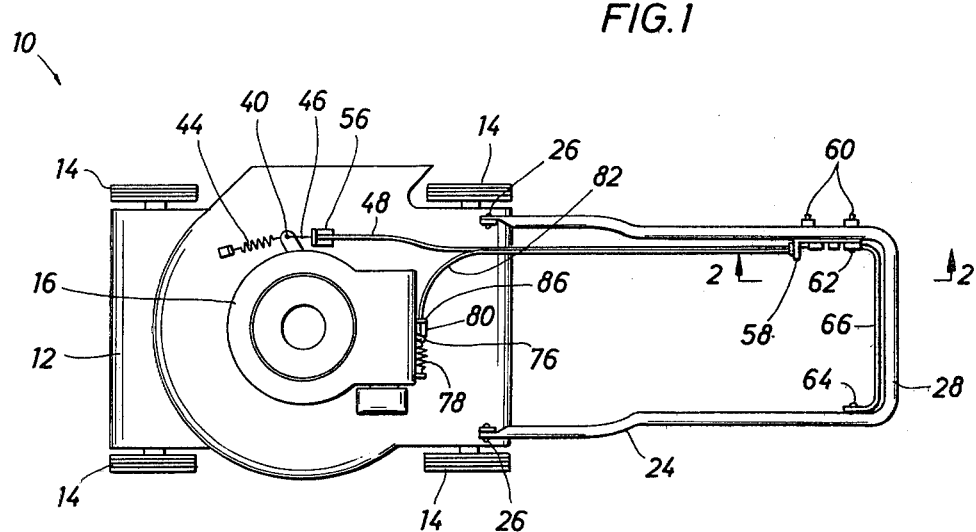
FIG. 1 is a plan view of the improved lawn mower of the present invention.

Lawn mower 10 as shown in FIG. 1 includes housing 12, wheels 14 mounted thereon to allow housing 12 to be rolled on the lawn to be cut, engine 16 mounted on housing 12, cutting blade 18 connected to drive shaft 20 of engine 16 by clutch assembly 22. Mower 10 is pushed and directed by U-shaped handle 24 which is connected to housing 12 by suitable means, such as bolts 26. Handle 24 extends upward and rearward from housing 12 in the usual manner and has cross portion 28 which is grasped by the operator to push and steer.

Figure 7:
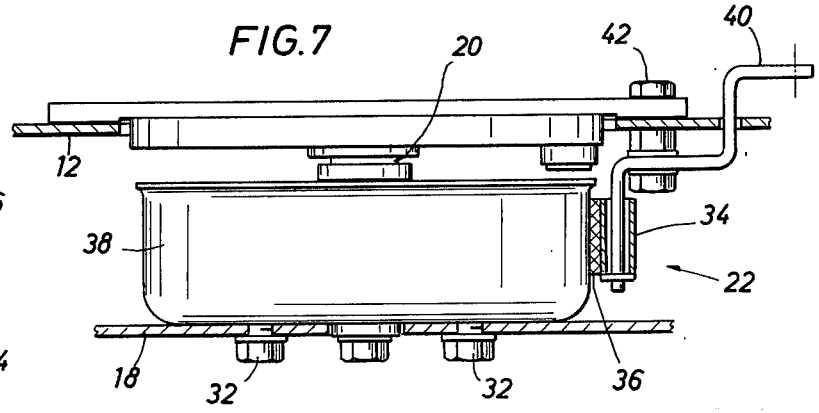
FIG. 7 is a sectional view illustrating the clutch assembly connecting from the engine drive shaft to the cutting blade and the brake assembly.

As best seen in FIG. 7, clutch assembly 22 which is centrifugal clutch, is suitably keyed to drive shaft 20 and cutting blade 18 is secured to clutch assembly 22 by bolts 32. Brake assembly or brake 34 includes brake band 36 which is tightened about clutch housing 38 by movement of brake actuating arm 40 about its pivot pin 42. When the brake is applied, the rotation of cutting blade 18 is stopped. With a centrifugal clutch, such as shown, it is desired that when clutch housing 38 is stopped the rotation of drive shaft 20 be slowed to prevent slipping of clutch assembly 22. Arm 40 is biased by spring 44 to the brake set or braking position.

Figure 2:
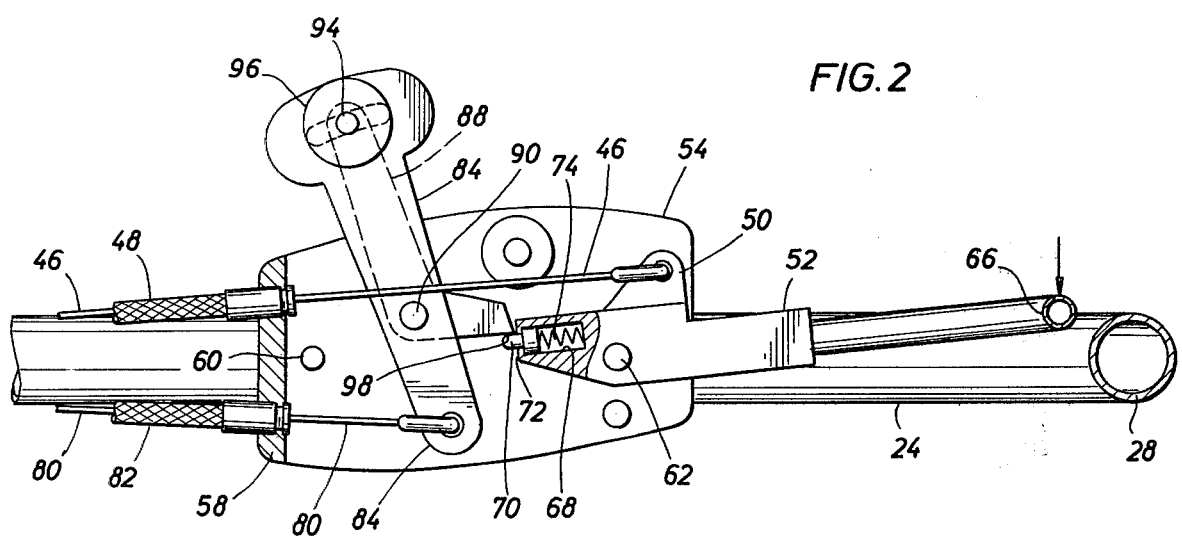
FIG. 2 is an elevation view taken along line 2—2 in FIG. 1 of the improved mower controls in operating position.
Figure 3:
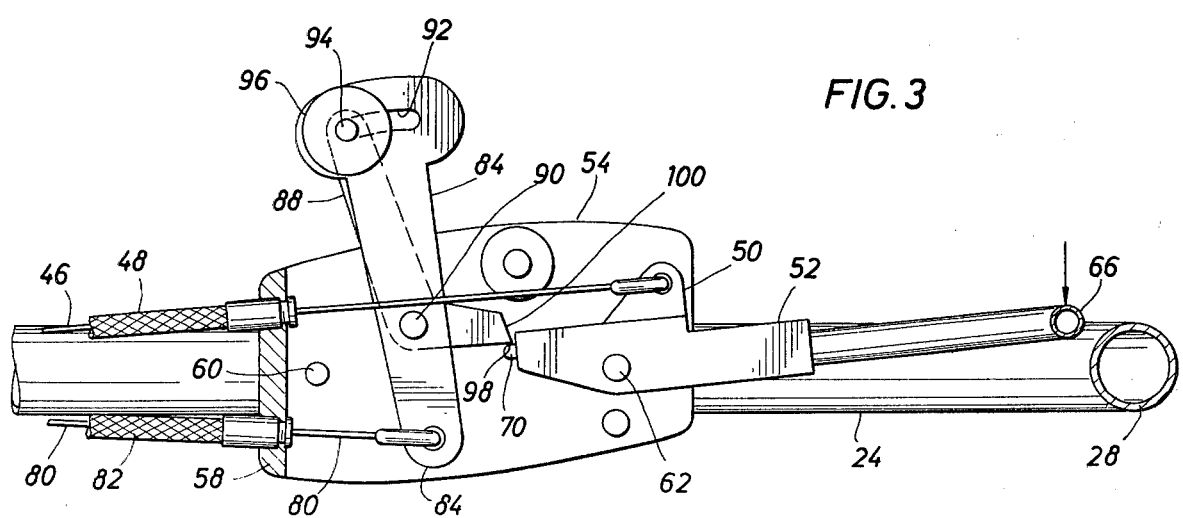
FIG. 3 is another elevation view of the controls to illustrate throttle adjustment in operating position.

Brake control line or cable 46 is connected to arm 40, extends through conduit or sheath 48 and connects to ear 50 on brake control lever 52 which is mounted on control plate 54 near the rear of handle 24. Sheath 48 is secured to housing 12 by angle bracket 56 and is secured to flange 58 of control plate 54. Control plate 54 is secured to the inside of handle 24 by bolts 60 as shown. Brake control lever 52 is pivotally mounted on plate 54 by pin 62 and also is pivotally mounted at its opposite end to handle 24 by pin 64 extending through handle 24 in a position aligned with pin 62. Brake control lever 52 includes cross portion 66 extending parallel to cross postion 28 of handle 24 and in operating position, as shown in FIGS. 2 and 3, is sufficiently close to portion 28 to allow the operator to easily grasp and hold both such cross portions.

The end of lever 52 adjacent control plate 54 and opposite cross portion 66 has recess 68 therein with detent 70 in recess 68 and projecting beyond the surface 72 of lever 52. Spring 74 in recess 68 urges detent 70 to its outermost projecting position.

Throttle actuating arm 76 connects to engine 16 and controls its speed. Spring 78 biases arm 76 toward the idle and shut-off positions and with no other forces on arm 76 is sufficiently strong to move arm 76 to the shut-off position. Throttle control line or cable 80 connects to arm 76, extends through sheath or conduit 82 and connects to the lower end of first throttle lever 84. Sheath 82 is secured by angle bracket 86 to housing 12 and by flange 58 to control plate 54. First throttle lever 84 and second control throttle lever 88 are pivotally mounted to control plate 54 by pin 90. Arcuate slot 92 in the upper end of first lever 84 receives the shank of bolt 94 whose head 95 is on the outside of second lever 88. The shank of bolt 94 extends through a hole in second lever 88 and is threaded to receive the enlarged nut 96. Thus, tightening of nut 96 causes levers 84 and 88 to be secured together. Loosening of nut 96 allows relative movement of lever 84 with respect to lever 88 to the extent of slot 92 to allow speed adjustment during operation. This relative movement is seen in FIG. 3 wherein first lever 84 has been moved rearwardly from the position shown in FIG 2 while lever 88 has not moved. The same amount of movement of lever 84 forwardly is available without moving lever 88. Thus, engine 16 may have its speed increased or decreased during operations without applying brake 34. The end of lever 88 opposite bolt 94 extends rearwardly and terminates in shoulder 98 and cam surface 100.

Figure 4:
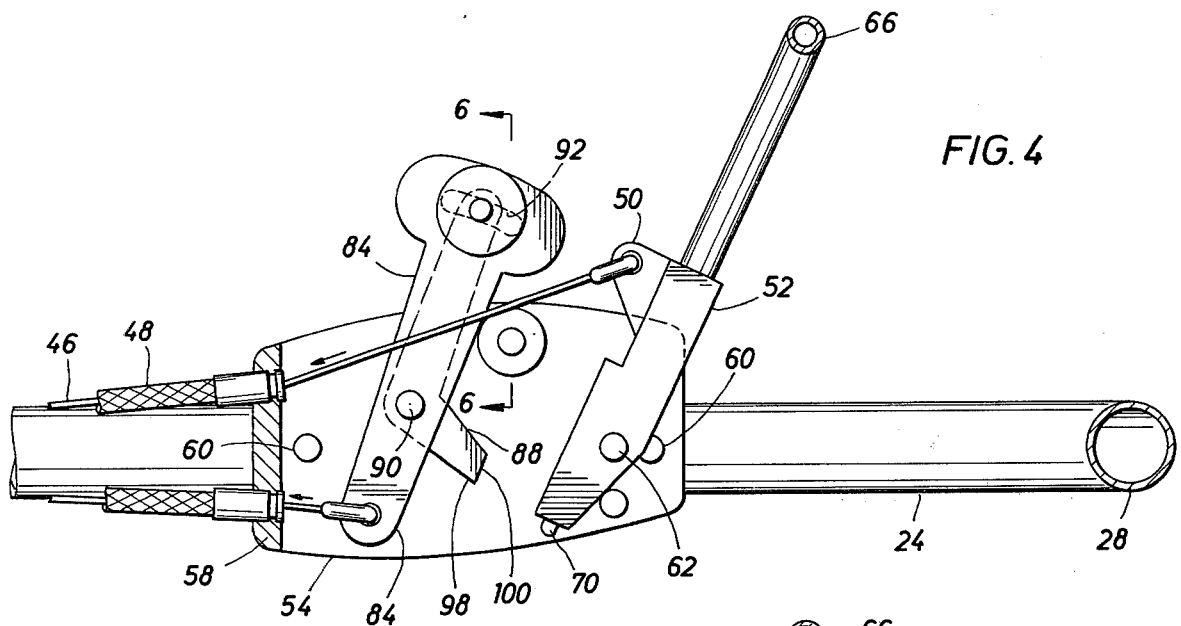
FIG. 4 is another elevation view of the controls showing the brake control lever released and the throttle control levers in idle position.
Figure 5:
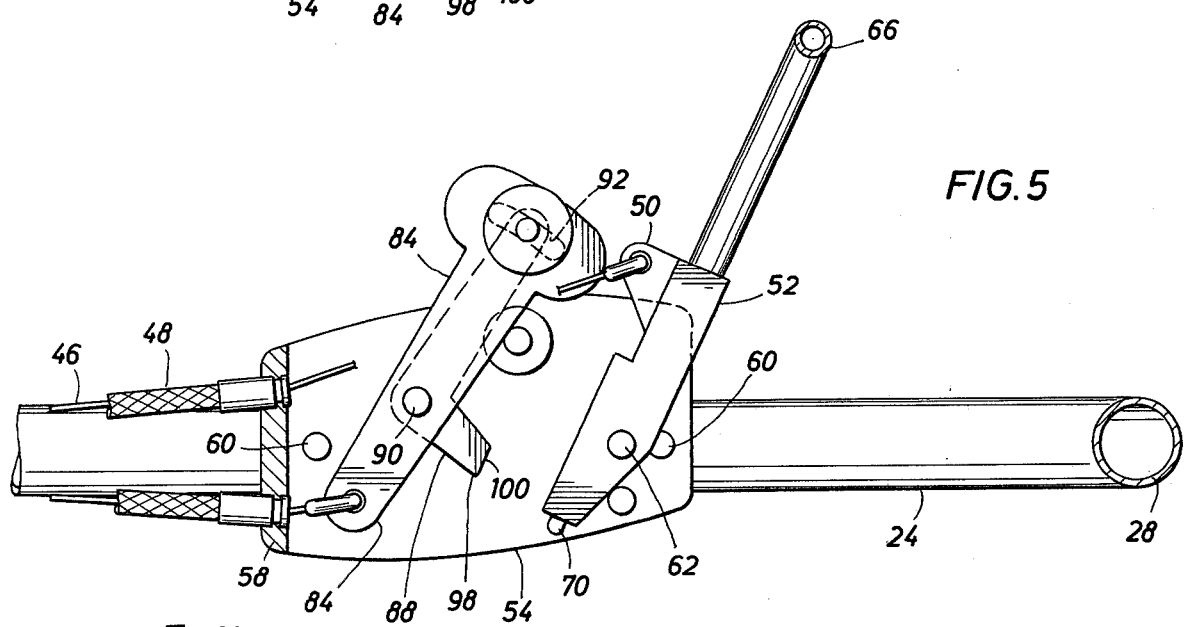
FIG. 5 is another elevation view of the controls showing the brake control lever released and the throttle control levers in shut-off position.
Figure 6:
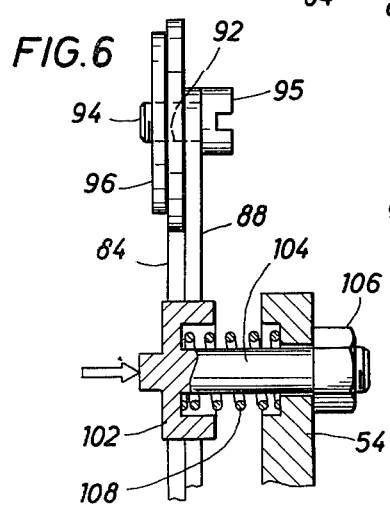
FIG. 6 is a sectional view taken along line 6—6 in FIG. 4 to show the structure of the idle support button.

Idle button 102, shown in FIG. 6, is mounted on plate 54 in position to engage and support lever 84 in idle position whenever lever 84 is not held in operating position. Button 102 is supported on shaft 104 with nut 106 threaded thereon to retain it in plate 54. Spring 108 engages button 102 to urge it to its outer or idle position as shown in FIGS. 4 and 6. Depressing button 102 toward plate 54 removes the support for lever 84 and allows it to move to its shut-off position as shown in FIG. 5.

When it is desired to operate lawn mower 10, engine 16 is started in the usual manner after advancing throttle levers 84 and 88 to the idle position. Mower 10 is then moved to the cutting location. Brake control lever 52 is moved back to brake release position and cross portion 66 is held close to cross portion 28 of handle 24 as throttle levers 84 and 88 are advanced until surface 100 cams detent 70 into recess 68. When shoulder 98 has moved past detent 70, detent 70 is moved outwardly by spring 108 to the position shown in FIG. 2 retaining the throttle levers 84 and 88 in operating position. If an adjustment in engine speed is desired then nut 96 is loosened and throttle lever 84 is advanced for greater speed or retracted for slower speed. Nut 96 is tightened when the desired speed is obtained. Throttle control levers 84 and 88 are then supported by detent 70 in their operating speed position. In the event the operator releases cross portion 68, lever 52 pivots to the braking position shown in FIG. 4 and throttle levers 84 and 88 are moved to the idle position supported by idle button 102. This causes the rotation of cutting blade 18 to stop and engine 16 to be throttled down to idle so that clutch assembly 22 is relieved of slipping. Clutch assembly 22 does not develop sufficient force for engagement at engine idle speed.

The present invention has application to other types of clutch mechanisms provided the clutch disengages on reducing the engine to idle speed or the clutch may be disengaged by the action of arm 40. These improved controls for a lawn mower assure that the cutting blade is not rotating unless an operator is manually holding the lever 52 in the brake release or operating position.

What is claimed is:

1. A lawn mower control system comprising
a control plate,
a throttle control lever pivotally mounted on said control plate,
a brake control lever pivotally mounted on said control plate,
said levers being independently movable, and
means on said brake control lever to releasably engage said throttle control lever subsequent to its setting and hold it in operating position and releasing said throttle control lever to idle position when said brake control lever is released.

2. A lawn mower control system comprising
a control plate,
a throttle control lever pivotally mounted on said control plate,
a brake control lever pivotally mounted on said control plate,
means on said brake control lever to engage said throttle control lever and hold it in operating position and releasing said throttle control lever to idle position when said brake control lever is released,
a second throttle control lever pivotally mounted with the first throttle control lever to said control plate,
a control line connected to said first throttle control lever,
said second lever being engaged by said engaging means on said brake control lever, and
means releasably interconnecting said throttle control levers.

3. A control system according to claim 1 including
an idle button mounted on said control plate in a position to support said throttle control lever in idle position.

4. A control system according to claim 3 wherein said idle button is movably mounted on said plate and biased to a throttle control lever support position and moved out of such support position to allow said throttle control lever to move to shut-off position.

5. A lawn mower control system comprising
a control plate,
a throttle control lever pivotally mounted on said control plate,
a brake control lever pivotally mounted on said control plate,
means on said brake control lever to engage said throttle control lever and hold it in operating position and releasing said throttle control lever to idle position when said brake control lever is released, and
said engaging means including a amovable detent mounted in said brake control lever and extending therefrom to engage a shoulder on said throttle control lever to hold it in operating position.

6. A control system according to claim 1 including
means to secure the control plate to the handle of a lawn mower.

7. A lawn mower comprising
a housing having a handle, wheels, an engine having a throttle actuating arm, means biasing said throttle actuating lever to idle and shut-off position, a cutting blade, a clutch connecting the blade to the engine, and a brake positioned to stop blade rotation and having a brake actuating arm and means biasing the brake actuating lever to braking position,
a brake control lever,
a control line connecting said brake actuating arm to said brake control lever,
a throttle control lever, and
a control line connecting said throttle actuating arm to said throttle control lever,
said brake control lever and said throttle control lever being mounted on said handle and in position relative to each other so that said levers are independently movable with respect to each other and said brake control lever when held in operating position holds said throttle control lever in running position and when said brake control lever is released, said throttle control lever is released to return to idle position.

8. A lawn mower according to claim 7 including
a control plate mounted on the handle,
said control levers being mounted on said control plate.

9. A lawn mower comprising
a housing having a handle, wheels, an engine having a throttle actuating arm, means biasing said throttle actuating lever to idle and shut-off position, a cutting blade, a clutch connecting the blade to the engine, and a brake positioned to stop blade rotation and having a brake actuating arm and means biasing the brake actuating lever to braking position, a brake control lever, a control line connecting said brake actuating arm to said brake control lever, a throttle control lever, a control line connecting said throttle actuating arm to said throttle control lever, said brake control lever and said throttle control lever being mounted on said handle and in position relative to each other so that said brake control lever when held in operating position holds said throttle control lever in running position and when said brake control lever is released, said throttle control lever is released to return to idle position, a second throttle control lever pivotally mounted with the other throttle control member, said second throttle control lever being engaged by said brake control lever in operating position, and means releasably connecting said second throttle control lever to the other throttle control lever whereby with said second throttle control lever held in operating position by said brake control lever said other throttle control lever may be moved to increase or decrease the speed of the engine.

10. A lawn mower comprising:

a housing, wheels mounted on the housing, a U-shaped handle connected to the housing and extending upwardly and rearwardly, an engine having a drive shaft mounted on the housing, a cutting blade positioned under the housing, a clutch assembly connecting the cutting blade to the drive shaft of said engine, a brake assembly adapted to stop rotation of the cutting blade, a brake control line connected to said brake assembly to apply and release said brake assembly, means biasing said brake control line to the brake applying position, a throttle control line connected to said motor to control the speed thereof, means biasing the motor and the throttle control line toward the motor idle position, a control plate secured to one side of the handle near its rear cross portion, a brake control lever pivotally connected to the control plate, said brake control line connected to said brake control lever in a position whereby when the brake control lever is in operating position when held close to the rear cross portion of the handle with the brake disengaged and on release of said brake control lever it pivots upward and forward to apply the brake, a first and a second throttle control levers pivotally to the control plate, a transverse arcuate slot in the upper end of said first lever, a bolt extending through said slot and through a hole in the upper end of the second lever, means threaded onto the bolt for securing said first and second levers against movement relative to each other, said throttle control line being connected to said first throttle control lever, said second throttle control lever having a projection extending in the direction of said brake control lever, a detent projecting from the end of said brake control lever facing said throttle control levers, the projection on said second throttle control lever engaging said detent when said brake control lever is held in operating position with said throttle control levers in advanced position and when said brake control lever is released said throttle control levers move to idle position, and an idle button extending from the side of the control plate and biased to a position to engage one of said first throttle lever to support it in motor idle position, depression of said idle button removing support for said throttle control lever to allow it to move to shut-off position.

* * * * *